Patented Aug. 15, 1933

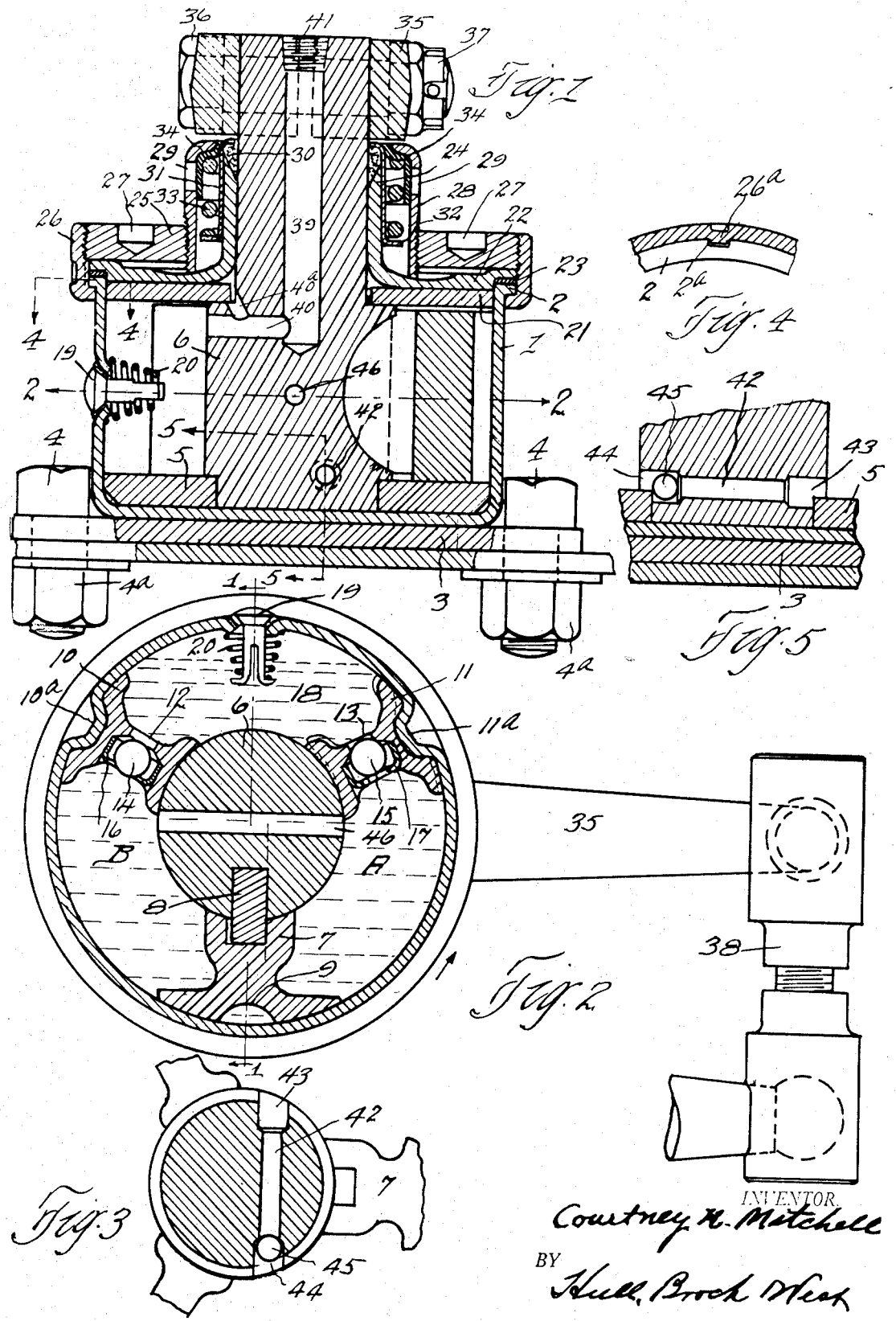

1,923,038

UNITED STATES PATENT OFFICE 1,923,038

HYDRAULIC SHOCK ABSORBER

Courtney N. Mitchell, Cleveland, Ohio

Application August 22, 1929. Serial No. 387,587

33 Claims. (Cl. 188—89)

This invention relates generally to a hydraulic shock absorber and more particularly to that class of shock absorbers adapted for use with motor vehicles.

The main object of the invention is to provide a shock absorber for checking the movement between two relatively movable members and which due to its peculiar construction and arrangement of parts is well adapted for quantity production at an exceptionally low cost and which is efficient and dependable in operation.

Another object of the invention is to provide a shock absorber of the character described in which the working parts are so constructed and arranged as to allow for errors in dimensions of the working parts.

A further object of the invention is to provide a shock absorber for motor vehicles which will operate to retard the relative movement between the body and axle in either direction and without specially machined parts for right and left hand units.

A further object of the invention is to provide a shock absorber of the character described which will automatically relieve excessive pressure within the working chamber and thus prevent breakage that may occur as the result of such excessive pressures.

A further object of the invention is to provide a shock absorber of the character described which is provided with an auxiliary supply reservoir or chamber which is disposed within the contour of the walls of the casing.

A still further object of the invention is to provide a shock absorber for motor vehicles in which substantially all of the parts are formed either of metal stampings or screw machine products.

A still further object of the invention is to provide a hydraulic shock absorber for motor vehicles in which a maximum checking action is obtained at the ends of the stroke of the piston in either direction.

Further and more limited objects of the invention will appear as the description proceeds and by reference to the accompanying drawing in which Fig. 1 is a vertical sectional view of my improved shock absorber arranged in the position which it will occupy when attached to motor vehicles, and taken on the line 1—1 of Fig. 2; Fig. 2 is a vertical sectional view taken on the line 2—2 of Fig. 1; Fig. 3 is a fragmentary view partly in section and partly in elevation disclosing the shaft with the piston and abutments at right angles to the position shown in Fig. 2; Fig. 4 is a fragmentary sectional view on the line 4—4 of Fig. 1; and Fig. 5 is a fragmentary sectional view on the line 5—5 of Fig. 1.

Referring now to the drawing, reference character 1 designates the annular casing which is preferably formed of a metal stamping and which is provided with an overhanging peripheral flange 2. Secured to the inner or bottom end of the casing 1 is a plate 3 which is preferably welded thereto. The plate 3 has openings therein and is adapted to be secured to the vehicle frame by means of bolts 4 and nuts 4ª. Arranged within the casing or housing 1 is a bearing ring 5 having a centrally disposed annular opening therein. Journaled within the casing 1 is a shaft 6 the inner end of which is provided with a shoulder which fits within the opening in the bearing ring. Secured to the shaft is a piston 7 which traverses the space between the walls of the casing and the shaft and is secured thereto by a key 8 in such a manner that the piston has a limited movement with respect to the shaft so as to enable it to adjust itself to variations in the wall of the casing. The piston 7 is provided with a longitudinally extending recess or bore 9 which forms a compartment which functions as a pressure reducing chamber between the pair of working compartments and also forms a labyrinth seal to prevent leakage past the face of the piston. Also arranged within the casing are a pair of abutments 10 and 11 which traverse the space between the walls of the casings and the shaft and are non-rotatably secured to the casing by means of keys 10ª and 11ª stamped into the walls of the casing which permit a slight movement of the abutments with respect to the casing as well as with respect to each other. The abutments 10 and 11 are provided with openings 12 and 13 respectively as shown most clearly in Fig. 2. The openings 12 and 13 are adapted to be closed by ball check valves 14 and 15 which are held in place by thimbles or sleeves 16 and 17. The abutments 10 and 11 arranged as described provide a segmental auxiliary supply reservoir 18 and cooperate with the piston and walls of the casing to define a pair of working chambers A and B. The auxiliary supply reservoir 18 is provided with a vent opening which is closed by an outwardly opening vent valve 19 normally held to its seat by spring 20.

Surrounding the upper end of the shaft and fitting within the upper end of the casing is a cover plate 21 which rests at its inner edge upon a shoulder on the shaft. Also surrounding the shaft and closing the upper end of the casing is a cover 22 which rests upon the overhanging peripheral flange 2 of the casing. Disposed between the cover and overhanging flange is a gasket 23. The cover 22 is provided with an annular upstanding shoulder 24 which surrounds the shaft and fits thereon. Disposed over the cover 22 is a thrust ring 25 which is interiorly and exteriorly threaded. Surrounding the upper end of the casing is an annular interiorly threaded member or ring 26 which is threadedly secured to the thrust ring 25 and is provided with an inwardly directed portion which fits under the overhanging peripheral flange 2. The ring 26 is also provided with an inwardly directed lug or projection 26ª which engages in a notch 2ª formed in the overhanging peripheral flange 2 and serves to hold the ring against rotation with respect thereto. The thrust ring 25 is provided with notched portions or recesses 27 which form tool receiving portions by means of which the thrust ring may be tightened to securely clamp the cover 22 in place. Extending through the thrust ring and threadedly secured thereto is a cap 28 which bears against the cover plate 22 as shown most clearly in Fig. 1. The cap 28 is provided with openings 29 which form tool receiving portions by means of which the cap may be screwed inwardly. Arranged within the shoulder portion 24 of the cover 22 is a packing ring 30 and fitting over this portion is a packing cup 31, the upper end of which is provided with an inwardly directed portion which extends over the packing ring and serves to hold the same in place. The inner end of the packing cup 31 is provided with an outwardly directed peripheral flange 32. Arranged within the cap 28 is a coil spring 33 which bears against the peripheral flange 32 and holds the packing cup in place. Also arranged within the cap 28 is a thimble 34 formed of leather, fiber, or other suitable material and which is disposed over the openings 29 in the cap and serves to prevent water or other material from entering the openings. The inwardly directed portion of the packing cup engages the packing ring 30 and serves to hold the packing in place.

The outer surface of the packing cup is provided with corrugations which engage the thimble 34 to hold the same in place. It will therefore be seen that the spring pressed packing cup holds the packing in place and prevents the packing from turning with the shaft and also serves to hold the thimble in the position to close the openings in the cap 28. The entire cover structure is formed of metal stampings and by screwing the cap 28 inwardly the cover 22 may be caused to flex inwardly to vary the clearance between cover plate 21 and the piston and abutments and thus vary the hydraulic resistance to the movement of the shaft in either direction. The abutments are slightly longer than the piston so that the clearance between the piston and cover plate 21 is considerably greater than the clearance in the ends of the abutments so that when the shaft is turned, the liquid will tend to flow past the ends of the piston rather than past the abutments into the auxiliary supply reservoir 18.

As the entire cover structure is formed of relatively thin stamped or drawn metal the whole cover will flex outwardly when the pressure in the shock absorber is excessive and thus act as a safety pressure regulator, preventing excessive pressure from causing damage to the connections or to the unit itself. The shaft projects beyond the end of the cap and the end portion thereof is preferably square in cross section.

Non-rotatably connected to the outer end of the shaft is a lever arm 35 which fits over the end of the shaft and is secured thereto by the clamping bolt 36 and a nut 37. The outer end of the lever arm 35 is preferably connected with the vehicle axle by means of a universal adjustable connection 38.

Extending axially of the shaft is a bore 39 which intersects a transverse bore 40. The bores 39 and 40 serve as a means for filling the casing with a suitable liquid. The shaft is also provided with a port or drain opening 40ª through which any liquid which may escape past the cover plate 22 may be drawn back into one of the working compartments when the pressure therein is decreased. The outer end of the bore 39 is closed by a plug 41. Extending transversely of the shaft adjacent the inner end thereof is a transverse bore or passageway 42, the opposite ends of which are counterbored, as shown at 43 and 44. Arranged within the counterbored portion 44 is a ball check valve 45 which serves to prevent the flow of liquid through the bore in one direction and permits a limited flow through the bore in an opposite direction.

The bore 42 is so positioned with respect to the bearing ring 5 that the bearing ring serves to hold the ball check valve 45 in place, as shown most clearly in Fig. 5. In other words, the bore is so located with respect to the bearing ring that the bearing ring will hold the ball in the counterbored portion. The transverse bore 42 is located at such a position with respect to the abutments 10 and 11 that the shaft will have to turn through a considerable angle in either direction before the counterbored portion is closed by the abutment adjacent to that end of the bore. When the shaft has been moved to this position, the bore is entirely closed and all flow therethrough is cut off and a maximum hydraulic resistance is offered to further movement of the shaft in this direction. The ball check valve 45 seats in the counterbored portion 44 but has sufficient clearance between its seat and the bearing ring to permit a limited flow through the bore and the amount of flow through the bore in this direction may be regulated by the selection of a larger or a smaller ball check valve so as to further restrict or increase the size of the passageway and thus give a greater or less hydraulic resistance.

The shaft 5 is preferably, though not necessarily, provided with a second transverse bore or passageway 46 which is located at such a position with respect to the abutments that the shaft will be permitted to move a slight distance from normal position, as shown in Fig. 2, before the bore is closed by one of the abutments. It will thus be seen that the shaft may move a slight distance in either direction without any material checking action.

Assuming that the shock absorber has been assembled in the manner described and filled with a liquid and the parts are in the position shown in Fig. 2, it will be seen that upon movement of the shaft in the direction of the arrow in Fig. 2 the shaft will tend to turn in a counter clockwise direction. Upon first movement of the shaft there will be an unrestricted flow of liquid from the chamber A through the bore 46 to the chamber B until the end of the bore 46 is closed by the abutment 11. Upon further movement of the shaft, additional hydraulic resistance will be offered. The liquid within the chamber A will tend to flow through the bore 42 and past the ball check valve 45. The amount of liquid passing through this passage will be determined by the relative size of the ball check valve 45 and the counterbored portion 44. After the shaft has been moved to such a position that the opposite end of the bore 42 is closed by the abutment 11, the maximum hydraulic resistance will be offered. At this point, the liquid within the chamber A can escape only past the ends of the piston. The amount of liquid passing beyond the ends of the piston is determined by the adjustment of the cap 28 which flexes the cover plate 21 inwardly to vary this resistance. If excessive pressure is obtained within the working chamber, there may be some flow of liquid past the abutment 11 but the abutments are of such length that liquid will flow past the ends thereof only when excessive pressure is obtained. If abnormally high pressure is obtained in the working compartment A, the cover structure will flex outwardly and provide a larger clearance at the ends of the piston, thus relieving the pressure. When the downward movement of the vehicle body is discontinued, the rebound of the vehicle springs will cause the shaft to turn in the opposite direction or clockwise. Upon movement of the shaft in this direction, the ball check valve 45 will be forced to its seat and there will be no flow through the bore 42 and the liquid will escape from the chamber B only around the ends of the piston. It will threfore be seen that the maximum checking action will be obtained on the upstroke of the vehicle body. As the shaft is moved to increase the pressure in the chamber B, the pressure within the chamber A will be decreased and a small amount of liquid will be drawn from the reserve supply reservoir 18 to make up whatever deficiency that may exist in this chamber. It will also be noted that there will be an unrestricted flow of liquid from the chamber B to the chamber A through the bore 46 until the end of the bore is closed by the abutment 10. When the shaft is moved the maximum distance in either direction one end of the bore 42 will be closed by one or the other of the abutments. It will thus be seen that maximum checking action is obtained at the beginning and at the end of each stroke.

The bore 46 is provided primarily to permit free movement of the vehicle body for minor road irregularities. However, this bore is not essential to the operation of the device and may be omitted, if desired.

In order to adapt the device for use on the opposite side of the vehicle, it is merely necessary to remove the ball check valve 45 from the counterbored portion 44 and insert it into the counterbored portion 43 at the opposite end of the bore. It will thus be seen that the device may be changed from a left hand to a right hand unit without change or substitution of special parts. Should excessive pressure be obtained within the auxiliary reservoir, the vent valve 19 will be opened against the pressure of the spring 20 and permit the liquid to escape. However, this condition never exists in the normal operation of the device.

Various changes may be made in the details of construction as well as in the manner of arranging or securing the various parts in position without departing from the spirit of my invention and while, according to the preferred construction, all parts of the device are made of either metal stampings or screw machine products, it is obvious that machined parts may be used, if desired.

It is therefore to be understood that the embodiment of the invention herein disclosed is merely illustrative and is not to be considered in a limiting sense and the invention is limited only in accordance with the scope of the appended claims.

Having thus described my invention, what I claim is:

1. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said shaft having a transverse bore therein which is counterbored at the opposite ends thereof, a check valve adapted to be arranged within one or other of said counterbored portions whereby to adapt the shock absorber for use on either the right or left hand side of an automotive vehicle.

2. A hydraulic shock absorber comprising a casing, a shaft journaled in said casing, a piston traversing the space between the walls of said casing and shaft, a pair of separate and independent and loosely mounted abutments traversing the space between the walls of said casing and shaft and defining an auxiliary supply reservoir and a pair of working compartments, and an outwardly opening vent valve in said auxiliary supply reservoir to prevent excess pressure therein.

3. A hydraulic shock absorber comprising a casing, a shaft journaled in said casing, a piston traversing the space between the walls of said casing and shaft, a pair of abutments traversing the space between the space between the walls of said casing and shaft and defining an auxiliary supply reservoir and a pair of working compartments, check valves in said abutments providing communication with the working chambers defined by said piston and abutments, said shaft having a transverse bore therein connecting the working compartments, and a check valve adapted to be arranged adjacent one or the other end of said bore whereby to adapt the shock absorber for use on either the right or left hand side of a vehicle.

4. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said abutments being keyed to said casing by means of keys stamped into the walls of the casing.

5. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said piston being keyed to said shaft and having a limited movement with respect thereto so as to enable said piston to adjust itself to variations in the wall of said casing.

6. A hydraulic shock absorber comprising a casing, a shaft journaled in said casing, a piston traversing the space between the walls of said casing and shaft, a pair of loosely mounted abutments traversing the space between the walls of said casing and shaft and defining an auxiliary supply reservoir and a pair of working compartments, said shaft having a transverse bore therein directly connecting the two working chambers when the shock absorber is in normal position, said bore being so positioned with respect to said abutments as to be closed by one or the other of said abutments upon a limited movement of said shaft.

7. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said shaft having a transverse bore therein connecting the working chambers, said bore being counterbored at one end thereof, a check valve arranged in said counterbored portion and a bearing ring surrounding said shaft and holding said check valve in place.

8. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said shaft having a transverse bore therein connecting the working chambers, said transverse bore being counterbored at the opposite ends thereof, a check valve adapted to be arranged within one or the other of said counterbored portions whereby to adapt the shock absorber for use on either the right or left hand side of the vehicle and a bearing ring surrounding said shaft and serving to hold said check valve in place.

9. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said shaft having a transverse bore therein disposed at such an angular distance from said pair of abutments that the shaft may be turned through a considerable angle before said bore will be closed by one or the other of said abutments.

10. A hydraulic shock absorber comprising a casing, a shaft journaled in said casing, a piston traversing the space between the walls of said casing and shaft, a pair of abutments traversing the space between the walls of said casing and shaft and defining a pair of working compartments, said shaft having a transverse bore therein the opposite ends of which are counterbored and adapted to receive a ball check valve therein, a ball check valve disposed in one of said counterbored portions, a bearing ring surrounding said shaft and holding said ball check valve in place, said ball check valve being of such size as to prevent flow through said bore in one direction but permitting a limited flow through said bore in the opposite direction.

11. A hydraulic shock absorber comprising a casing, a shaft journaled in said casing, a piston carried by said shaft, a pair of abutments carried by said casing and dividing the same into a pair of working compartments and an auxiliary supply reservoir, said pair of abutments being slightly longer than said piston whereby to cause the liquid to flow from one working compartment past said piston into the other working compartment rather than past one of the abutments and into the auxiliary supply reservoir, when the shaft is moved in either direction.

12. A hydraulic shock absorber comprising a casing, a shaft journaled in said casing, a pair of abutments arranged within said casing and defining an auxiliary supply reservoir enclosed within the contour of said casing, a piston carried by said shaft and defining a pair of working compartments, a cover for said casing and means for flexing said cover inwardly to vary the clearance between the cover and the piston and abutments.

13. A hydraulic shock absorber comprising a casing, a shaft journaled in said casing, a pair of abutments arranged within said casing and defining an auxiliary supply reservoir, a piston carried by said shaft and defining a pair of working compartments, a cover structure for said casing comprising an annular plate surrounding said shaft and movable axially thereof, a cover closing said casing, a thrust ring securing said cover in place, a cap extending through said cover and bearing against said cover, said thrust ring and bearing against said shaft to flex said cover inwardly to vary the hydraulic resistance to the movement of said shaft.

14. A hydraulic shock absorber comprising a casing, a shaft journaled in said casing, a pair of abutments arranged within said casing and defining an auxiliary supply reservoir, a piston carried by said shaft and defining a pair of working compartments, a cover structure for said casing comprising an annular plate surrounding said shaft and movable axially thereof, a cover closing said casing, a thrust ring securing said cover in place, a cap extending through said thrust ring and bearing against said cover, said cap being movable axially of said shaft to flex said cover inwardly to vary the hydraulic resistance to the movement of said shaft, the entire cover structure being formed of relatively thin drawn metal which permits the same to flex outwardly, when excessive pressure exists within the casing.

15. A hydraulic shock absorber comprising a casing, a shaft journaled in said casing and cooperating with said casing to form an annular chamber, a shaft journaled in said casing, a pair of abutments in said casing defining an auxiliary supply reservoir, said casing having an overhanging peripheral flange thereon and having a notch therein, an annular plate surrounding the upper portion of said shaft and closing said annular chamber, a cover for said casing, a thrust ring secured over said cover, an internally threaded ring engaging said cover and fitting under said peripheral flange and having a projection thereon fitting in said notch and holding the same against rotation, a cap extending through said thrust ring and bearing against said cover, said cap being adjustable axially of said shaft to flex said cover inwardly to vary the hydraulic resistance to the movement of the shaft.

16. A hydraulic shock absorber comprising a casing, a shaft journaled in said casing and cooperating with said casing to form an annular chamber, a shaft journaled in said casing, a pair of abutments in said casing defining an auxiliary supply reservoir, said casing having an overhanging peripheral flange thereon, an annular plate surrounding the upper portion of said shaft and closing said annular chamber, a cover for said casing, a thrust ring fitting over said cover, an internally threaded ring engaging said thrust ring and fitting under said peripheral flange, cooperating means on said internally threaded ring and flange for holding said internally threaded ring against rotation, a cap extending through said thrust ring and bearing against said cover, said cap being adjustable axially of said shaft to flex said cover inwardly to vary the hydraulic resistance to the movement of the shaft, said cap having a plurality of openings therein forming wrench receiving portions and a rubber thimble within said adjusting cap and closing said openings.

17. A hydraulic shock absorber comprising a casing, a shaft journaled in said casing and cooperating with said casing to form an annular chamber, a shaft journaled in said casing, a pair of abutments in said casing defining an auxiliary supply reservoir, said casing having an overhanging peripheral flange thereon and having a notch therein, an annular plate surrounding the upper portion of said shaft and closing said annular chamber, a cover for said casing, a thrust ring fitting over said cover, an internally threaded ring engaging said thrust ring and fitting under said peripheral flange and having a projection thereon fitting in said notch and holding the same against rotation, a cap extending through said thrust ring and bearing against said cover, said cap being adjustable axially of said shaft to flex said cover inwardly to vary the hydraulic resistance to the movement of the shaft, said cap having a plurality of openings therein forming wrench receiving portions and a rubber thimble within said adjusting cap and closing said openings, a packing disposed between said cover and shaft, a spring pressed packing cup surrounding said shaft and arranged within said cap, said cup having an inwardly directed portion engaging said packing and outer corrugations engaging said rubber thimble to hold the packing and thimble in place.

18. A hydraulic shock absorber of the character described comprising an annular casing adapted to be filled with a liquid, a shaft journaled in said casing, a pair of abutments traversing the space between the walls of said casing and shaft and arranged to define a segmental auxiliary liquid supply reservoir, a bearing ring surrounding said shaft, a cover structure for said casing, means for flexing a portion of said cover structure inwardly to vary the hydraulic resistance to the movement of said shaft.

19. A hydraulic shock absorber of the character described comprising an annular casing adapted to be filled with a liquid, a shaft journaled in said casing, a pair of abutments traversing the space between the walls of said casing and shaft and arranged to define a segmental auxiliary liquid supply reservoir, a bearing ring surrounding said shaft, a cover structure for said casing, means for flexing a portion of said cover structure inwardly to vary the hydraulic resistance to the movement of said shaft, said casing, bearing ring, abutments and cover structure being formed of drawn metal.

20. A hydraulic shock absorber comprising a casing, a shaft journaled in said casing, a piston traversing the space between the walls of said casing and shaft, a pair of independent and loosely mounted abutments traversing the space between the walls of said casing and shaft and defining an auxiliary supply reservoir and a pair of working compartments, said shaft having a transverse bore therein directly connecting the working compartments when the shock absorber is in normal position, said bore being so positioned with respect to said abutment as to be closed by one or the other of said abutments upon a limited movement of said shaft in either direction and a bearing ring surrounding said shaft and disposed at the inner end of said casing.

21. A hydraulic shock absorber comprising a casing, a shaft journaled in said casing, a piston traversing the space between the walls of said casing and shaft, a pair of independent and loosely mounted abutments traversing the space between the walls of said casing and shaft and defining an auxiliary supply reservoir and a pair of working compartments, said shaft having a transverse bore therein connecting the working chambers, said bore being counterbored at one end thereof, a check valve arranged in said counterbored portion and a bearing ring surrounding said shaft and disposed at the inner end of said casing.

22. A hydraulic shock absorber comprising a casing, a shaft journaled in said casing, a piston traversing the space between the walls of said casing and shaft, a pair of abutments traversing the space between the walls of said casing and shaft and defining an auxiliary supply reservoir and a pair of working compartments, said shaft having a transverse bore therein connecting the working chambers, said transverse bore being counterbored at the opposite ends thereof, a check valve adapted to be arranged within one or the other of said counterbored portions whereby to adapt the shock absorber for use on either the right or left hand side of the vehicle and a bearing ring surrounding said shaft and disposed at the inner end of said casing.

23. A hydraulic shock absorber of the character described comprising a casing adapted to be filled with a liquid, a shaft journaled in said casing, a pair of abutments traversing the space between the walls of said casing and shaft and arranged to define a segmental auxiliary liquid supply reservoir, a bearing ring surrounding said shaft and disposed at the inner end of said casing, a cover member closing the outer end of said casing, means for adjusting the position of said cover member to vary the hydraulic resistance to the movement of said shaft, said casing, bearing ring, abutments and cover member being formed of drawn metal.

24. A hydraulic check comprising a casing, a shaft journaled in said casing, a piston traversing the space between the walls of said casing and shaft, a pair of independent abutments traversing the space between the walls of said casing and shaft and cooperating with said piston to define an auxiliary supply reservoir and a pair of working compartments said abutments being loosely keyed in said casing so as to have a limited movement with respect thereto.

25. A hydraulic check comprising a casing, a shaft journaled in said casing, a piston carried by said shaft and traversing the space between the walls of said casing and shaft, a pair of abutments disposed within said casing and having a slight movement with respect to said casing and defining an auxiliary supply reservoir and a pair of working compartments, a cover for said casing and means associated with the cover for restricting the flow of liquid from one working compartment to the other working compartment without passing through said auxiliary reservoir.

26. A hydraulic shock absorber comprising a casing, a shaft journaled in said casing, a piston traversing the space between the walls of said casing and said shaft, a pair of abutments traversing the space between the walls of said casing and shaft and cooperating with said piston to define a reserve supply reservoir and a pair of working compartments, said shaft having a pair of substantially parallel bores extending transversely thereof and connecting the two working compartments when the piston is in normal position, said bores being so positioned with respect to said abutments as to be closed by one or the other of said abutments upon a limited movement of said shaft.

27. A hydraulic shock absorber of the character described comprising an annular casing formed of sheet metal and adapted to be filled with a liquid, a shaft journaled in said casing, a piston arranged within said casing and constrained to move within said shaft, a pair of abutments arranged within said casing and cooperating with said piston and shaft to define a pair of working compartments and an auxiliary supply reservoir, said piston having a slight movement with respect to said shaft and said abutments having a slight movement with respect to said casing.

28. In a hydraulic shock absorber the combination of a casing, a shaft journaled in said casing, a piston traversing the space between the walls of said casing and said shaft, a pair of abutments traversing the space between said casing and shaft and defining a reserve supply reservoir and a pair of working compartments, said abutments being separately and independently mounted, and means securing said abutments to said casing in such a manner as to permit movement thereof with respect to said casing whereby to provide a seal against leakage.

29. A hydraulic shock absorber comprising a casing, a shaft journaled in said casing, a piston traversing the space between the walls of said casing and said shaft, a pair of abutments traversing the space between the walls of said casing and said shaft and defining a pair of working compartments and a reserve supply reservoir, a pair of passageways between the working compartments adapted to be opened and closed by the movement of the shaft, a check valve provided in one of the passageways for closing the same independent of the position of said shaft, the other of said passageways being unrestricted.

30. A hydraulic shock absorber comprising a casing, a shaft journaled in said casing, a piston traversing the space between the walls of said casing and said shaft, a pair of abutments traversing the space between the walls of said casing and said shaft and defining a pair of working compartments and a reserve supply reservoir, a plurality of passages in said shaft connecting the working compartments and adapted to be opened and closed by the movement of the shaft, a check valve disposed in one of said passages, and means for varying the hydraulic resistance irrespective of the position of said shaft.

31. A hydraulic shock absorber comprising a casing, a shaft journaled in said casing, a piston traversing the space between the walls of said casing and said shaft, a pair of loosely mounted abutments traversing the space between the walls of said casing and said shaft and defining a pair of working compartments and a reserve supply reservoir, and means for varying the hydraulic resistance in a predetermined manner irrespective of the position of said shaft.

32. In a hydraulic check, a casing, a shaft and piston journaled in said casing, a pair of complementary abutments cooperating with the piston and casing to form a pair of working compartments and a reserve supply reservoir, each abutment having a limited movement with respect to said casing and adapted to act as valves to prevent the flow of liquid into the reservoir during the compression stroke of the piston but permitting the seepage of air into the reservoir during other periods of the operative cycle.

33. In a hydraulic check, a casing, a shaft and piston journaled in said casing, a pair of complementary abutments cooperating with the pisplementary abutments cooperating with the piston and casing to form a pair of working compartments and a reserve supply reservoir, each abutment having a limited movement with respect to said casing and adapted to act as valves to prevent the flow of liquid into the reservoir during the compression stroke of the piston but permitting the seepage of air into the reservoir during other periods of the operative cycle, and a check valve in one of said abutments permitting flow of liquid therethrough in one direction and preventing flow therethrough in the opposite direction.

COURTNEY N. MITCHELL.